(12) United States Patent
Lee et al.

(10) Patent No.: US 10,363,646 B2
(45) Date of Patent: Jul. 30, 2019

(54) MANUFACTURING FIXTURE SYSTEM AND ASSOCIATED PROCESS HAVING A REST PAD FORCE SENSOR WITH CLOSED LOOP FEEDBACK

(71) Applicant: Caterpillar Inc., Peoria, IL (US)

(72) Inventors: Nien Lee, Peoria, IL (US); Paul Murphy, Benson, IL (US); Michael Vogler, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 383 days.

(21) Appl. No.: 15/147,007

(22) Filed: May 5, 2016

(65) Prior Publication Data

US 2017/0320181 A1 Nov. 9, 2017

(51) Int. Cl.
*B23Q 17/00* (2006.01)
*G05B 19/00* (2006.01)

(52) U.S. Cl.
CPC ........... *B23Q 17/005* (2013.01); *G05B 19/00* (2013.01)

(58) Field of Classification Search
CPC combination set(s) only.
See application file for complete search history.

(56) References Cited

U.S. PATENT DOCUMENTS

| | | | |
|---|---|---|---|
| 6,094,793 A | 8/2000 | Szuba | |
| 6,415,191 B1 | 7/2002 | Pryor | |
| 8,661,684 B1 | 3/2014 | Boyd et al. | |
| 8,700,191 B2 * | 4/2014 | Marsh | B66F 3/08 187/203 |
| 9,618,410 B2 * | 4/2017 | Spicer | B23K 20/10 |
| 2004/0089178 A1 * | 5/2004 | Muller | B41F 21/104 101/408 |
| 2004/0227508 A1 * | 11/2004 | Shafiyan-Rad | B23Q 3/06 324/207.22 |
| 2007/0164762 A1 * | 7/2007 | Nayak | G01R 31/2891 324/750.24 |
| 2008/0296271 A1 | 12/2008 | Klein et al. | |

(Continued)

FOREIGN PATENT DOCUMENTS

CN 101362290 A 2/2009
CN 202185708 U 4/2012
(Continued)

*Primary Examiner* — Gregory J Toatley, Jr.
*Assistant Examiner* — Brandon J Becker
(74) *Attorney, Agent, or Firm* — Oblon, McClelland, Maier & Neustadt

(57) ABSTRACT

A manufacturing fixture process, and associated device for practicing the disclosed process, includes supporting a component during manufacturing by at least one rest pad, and sensing and transmitting a force signal exerted on the rest pad by the component during manufacturing by at least one sensor associated with the at least one rest pad. The process further includes clamping the component onto the rest pad by a clamping component configured to rigidly hold the component, receiving and monitoring the force exerted on the rest pad by a force monitoring system configured to receive and monitor the signal indicating the force exerted on the rest pad, as well as determine whether the force exerted on the rest pad is within a predetermined range, exceeds the predetermined range, and/or is below the predetermined range, and outputting the force exerted on the rest pad with an output device.

10 Claims, 3 Drawing Sheets

(56) References Cited

U.S. PATENT DOCUMENTS

| | | | |
|---|---|---|---|
| 2009/0134561 A1* | 5/2009 | Wang | B23Q 1/76 269/86 |
| 2009/0199396 A1* | 8/2009 | Shelley | H01R 43/20 29/709 |
| 2009/0283946 A1* | 11/2009 | Cai | B25B 11/002 269/8 |
| 2015/0165673 A1 | 6/2015 | Spicer et al. | |
| 2015/0314888 A1* | 11/2015 | Reid | B25J 9/1687 700/117 |

FOREIGN PATENT DOCUMENTS

| | | |
|---|---|---|
| CN | 103331647 A | 10/2013 |
| EP | 2103377 A1 | 9/2009 |
| EP | 2052810 B1 | 12/2010 |

* cited by examiner

MANUFACTURING FIXTURE SYSTEM AND ASSOCIATED PROCESS HAVING A REST PAD FORCE SENSOR WITH CLOSED LOOP FEEDBACK

TECHNICAL FIELD

This disclosure relates generally to a manufacturing fixture having a rest pad force sensor with a closed loop feedback and a process of using a manufacturing fixture having a rest pad force sensor with a closed loop feedback.

BACKGROUND

During machining, fabrication and other fixturing operations, mechanical workpieces are held in a fixture on one or more rest pads by one or more clamping devices. The workpieces need to have solid contact with rest pads to ensure dimensional conformance and stability of the workpieces during such operations as manufacturing, machining, tacking, welding or the like.

A problem that typically arises with rest pads, though, is that conventional fixtures require operators to manually ensure the positioning of the workpiece on the rest pads so that the appropriate contact force and workpiece positioning is achieved and/or maintained. For example, conventional fixtures typically require operators to use a filler gauge to check for any gaps between the workpiece and rest pads so that the appropriate contact force is achieved and/or maintained. If the appropriate contact force and workpiece positioning is not achieved and/or maintained, a workpiece might be constructed improperly during assembly operations resulting in the workpiece being warped, the workpiece being misaligned, the generation of waste parts, workpiece damage, injury to workers, damage to a manufacturing machine, and/or the like.

European Patent Publication EP2103377A1 (EP '377), entitled "Method and Apparatus for Checking Proper clamping of Workpieces in a CNC Machine," purports to prevent the machining of incorrectly positioned workpieces by continuously checking the proper clamping of work pieces. The EP '377 publication describes direct pressure measurement by wireless pressure transmitters capable of detecting and continuously transmitting pressure information to the CNC machine in hidden time. However, the EP '377 publication does not produce dynamic fixturing feedback and the ability to dynamically adjust individual forces to account for a dimensional feedback. Using air sensors to detect a gap in contact does not address the needs contemplated by the disclosed system.

Accordingly, there is a need for an improved system to monitor and record contact force information. In this regard, the shortcomings of the prior art are addressed by the various aspects in the disclosure.

SUMMARY

In one aspect, a manufacturing fixture assembly is configured to hold a component during manufacturing, the assembly including at least one rest pad configured to support, at least in part, the component during manufacturing, a sensor associated with the at least one rest pad and configured to sense a force exerted on the rest pad by the component during manufacturing, a clamping component configured to rigidly hold the component onto the rest pad, a force monitoring system configured to receive a signal from the sensor indicating the force exerted on the rest pad, wherein the force monitoring system is configured to determine whether the force exerted on the rest pad includes at least one of the following determinations: the force exerted on the rest pad is within a predetermined range, the force exerted on the rest pad exceeds the predetermined range, and the force exerted on the rest pad is below the predetermined range, and an output device configured to output the determinations of the force exerted on the rest pad.

In another aspect, a manufacturing fixture process configured to hold a component in proper fixture during manufacturing including supporting at least in part a component during manufacturing by at least one rest pad, sensing and transmitting a force signal exerted on the rest pad by the component during manufacturing by at least one sensor associated with the at least one rest pad, clamping the component onto the rest pad by a clamping component configured to rigidly hold the component with a pre-determined force, receiving and monitoring the at least one force exerted on the rest pad by a force monitoring system configured to receive and monitor the signal indicating the force exerted on the rest pad, and wherein the force monitoring system is configured to determine whether the force exerted on the rest pad includes at least one of the following determinations: the force exerted on the rest pad is within a predetermined range, the force exerted on the rest pad exceeds the predetermined range, and the force exerted on the rest pad is below the predetermined range, and outputting the force exerted on the rest pad with an output device.

DETAILED DESCRIPTION

In one aspect, the disclosure relates to an automated closed-loop feedback manufacturing process diagnostic and process control system for a component undergoing manufacturing and/or fixturing that detects contact forces from various inputs. In one aspect, the process and system acts to use live feedback signals to monitor contact forces in real-time, detect trends of the contact forces operating outside predetermined thresholds, and respond accordingly. The monitoring and detecting aspects include receiving various inputs from contact sensors. When the system is operating within the parameters of predetermined thresholds of contact forces, the system will continue in a steady state. During such operations, the closed-loop feedback system may take no action other than displaying forces. However, if the system detects a component is loose, contact forces are operating outside of predetermined threshold ranges, or the like, the system may respond by either alerting an operator of such violation, reducing or stopping in real-time the manufacturing operation before damage is done to the component or fixturing process generally, or the like. The system may utilize such monitoring systems as strain conditioners and display interfaces to alert an operator to reduce the forces applied, that there exists a gap or similar issue, and the like. Additionally, in some aspects if the system detects a component is loose, contact forces are operating outside of predetermined threshold ranges, or the like, the system may respond by adjusting the fixture to provide the proper contact forces.

Figure 1:
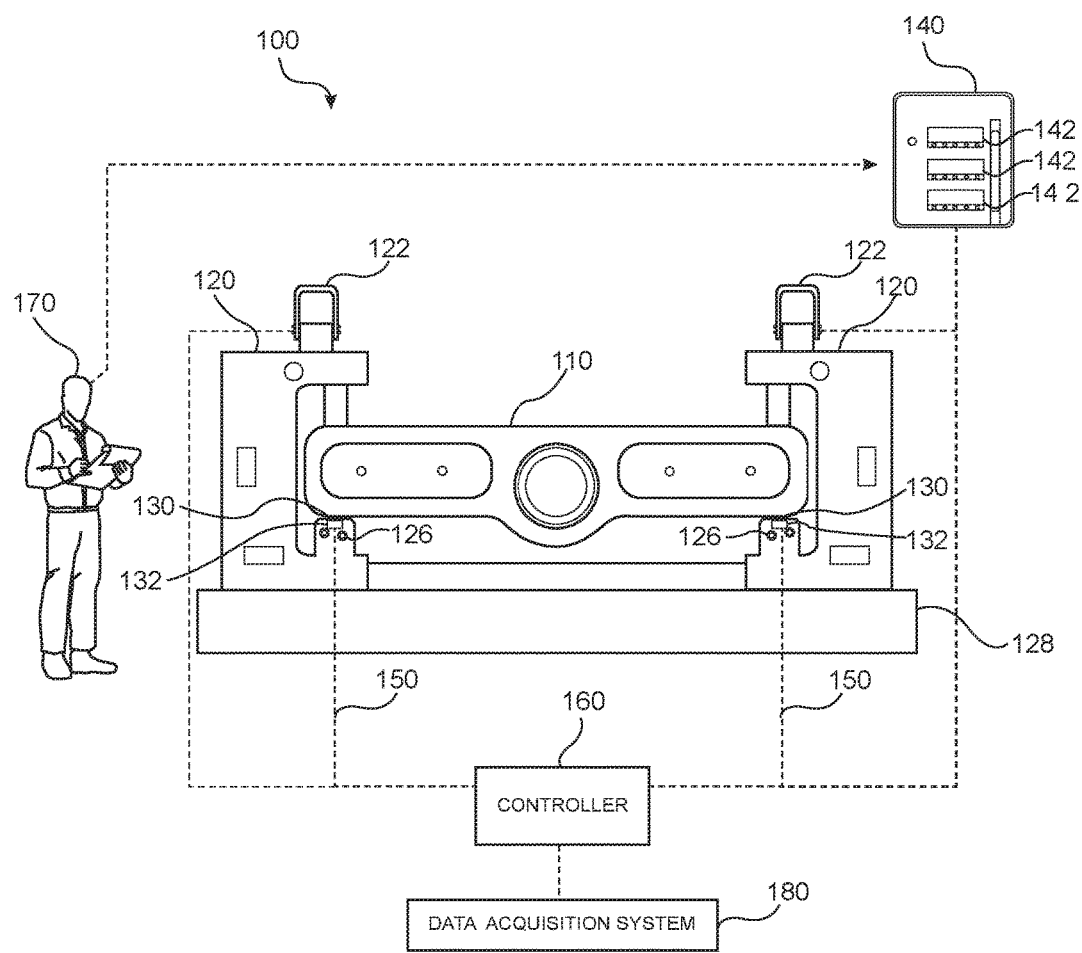
FIG. 1 illustrates an exemplary closed-loop feedback manufacturing device that includes production fixture rest pads having force sensing capability in accordance with aspects of the disclosure.

Now referring to the drawings, wherein like reference numbers refer to like elements, FIG. 1 illustrates an exemplary closed-loop feedback manufacturing system that includes production fixture rest pads 130 equipped with force measurement capability in accordance with aspects of the disclosure. A fixturing control system 100 may be used during manufacturing. The fixturing control system 100 may include a manufacturing machine 120. In the current example, a component 110 is displayed as an E-Bar component arranged or connected with the manufacturing machine 120 for manufacture, machining, welding, and the like on the fixturing control system 100. However, the component 110 can be any component 110 to be manufactured.

The manufacturing machine 120 may be affixed or adjustably coupled to a machine support system 128. The machine support system 128 may be configured as a permanent attachment, such as a machine bed or machine plate. In another contemplated aspect, the machine support system 128 may be configured to be interchangeable support system 128, such as a pallet.

The manufacturing machine 120 may be configured as a machining assembly to hold in fixture a workpiece or the component 110 to ensure solid contact with the fixturing control system 100. Moreover, the machine 120 may be configured to provide sufficient pressure throughout a given manufacturing or machining process needed for the component 110. For example, the machine 120 may be used during machining, fabrication, welding, tacking, or any other contemplated fixturing operations of the component 110. In one aspect, the machine 120 may include a clamping system 122 that may be equipped to provide the necessary compression or tension forces upon the component 110 to hold the component 110 in place. The clamping system 122 may include one or more of a pusher 126, a mechanical fastener, a clamp, and the like.

The clamping system 122 may be manually operated by an operator 170 and adjusted based on pre-determined thresholds of force to be applied on the component 110 in an x, y and/or z plane. In another aspect, the clamping system 122 may include a network of knobs, tightening bolts, pushers 126 that may likewise be used to adjust the forces applied to the component 110 accordingly.

In one aspect, the clamping system 122 may be pneumatically actuated, hydraulically actuated, electromagnetically actuated and/or the like. In this regard, the clamping system 122 may include a hydraulic actuator, a pneumatic actuator, an electromagnetic actuator, or the like. If a hydraulic actuator is utilized, the hydraulic actuator may include a hydraulic cylinder and a source of pressurized hydraulic fluid configured as a hydraulic system. If a pneumatic actuator is utilized, the pneumatic actuator may include a pneumatic cylinder and a source of pressurized pneumatic fluid configured as a pneumatic system. If an electromagnetic actuator is utilized, the electromagnetic actuator may include a solenoid and a source of electrical power to operate the solenoid configured as an electromagnetic system. The clamping system 122 may be controlled manually, autonomously or remotely as described in greater detail below.

The component 110 may be held in fixture with the pusher 126, a clamp, or similar component of the clamping system 122 to ensure solid contact with a production fixture rest pad 130 to ensure dimensional conformance and stability. A clamp of the clamping system 122 may hold a component 110 in fixture and may be configured to tighten or loosen to change an amount of force the clamping system 122 exerts upon the component 110 at any given time. An operator 170 may control the clamps, pushers 126 or the like of the clamping system 122 at any given time.

In one aspect, the clamping system 122 may operate with manually adjustable clamping components including the pusher 126, a clamp, mechanical fastener, or similar component. In one aspect, the clamping system 122 may operate with manually adjustable clamping components including the pusher 126, a clamp, mechanical fastener, or similar component and also operate with automated clamping components including one or more of pneumatically actuated, hydraulically actuated, electromagnetically actuated and/or the like type clamping components. In one aspect, the clamping system 122 may operate only with automated clamping components including one or more of pneumatically actuated, hydraulically actuated, electromagnetically actuated and/or the like type clamping components.

The component 110 may be in constant contact with one or more production fixture rest pads 130. In one aspect, the one or more production fixture rest pads 130 may be configured to be any geometric shape needed so as to interface with the component 110. For example, the production fixture rest pad 130 may be shaped as a rectangular block, spherical block, circular block, or any other geometric shape. The production fixture rest pad 130 may be made of a material strong enough to withstand the range of pressure or forces exerted upon it. In one aspect, the production fixture rest pad 130 may be formed of a metallic material. In one aspect, the production fixture rest pad 130 may be formed of aluminum, iron, steel, brass, and the like. In one aspect, the production fixture rest pad 130 may include a synthetic non-slip surface.

The fixturing control system 100 of the illustrated aspect may include a network of at least one or more sensors 132. The sensor 132 may be configured as a load cell, a strain gauge, or the like. In some aspects using a strain gauge, the force being sensed deforms the strain gauge. The strain gauge measures the deformation as a change in electrical resistance. This change electrical resistance is a measure of the strain and hence the applied forces.

In some aspects using a load cell, the load cell may include four strain gauges in a Wheatstone bridge configuration. Other numbers of strain gauges are contemplated as well.

The electrical signal output from the load cell or strain gauge may be in the order of a few millivolts and may require amplification by an amplifier before it can be used. The output of the load cell or strain gauge may be scaled to calculate the force applied to the production fixture rest pad 130. For example, the strain gauge may output a voltage signal based on a change in resistance when the production fixture rest pad 130 to which the strain gauge is attached to undergoes tension or compression. In one aspect, the sensor 132 may be coupled to a surface of a production fixture rest pad 130 or integrated into the production fixture rest pad 130. This allows for the sensor 132 to measure minute dimensional changes when the production fixture rest pad 130 is subjected to compression or tension.

Each sensor 132 may be configured with electrical circuitry to sense, monitor, receive, process, and/or transmit the force data. In one aspect, the sensor 132 may be implemented as the load cell. The sensor 132 may also be further arranged and equipped with electrical circuit to monitor, detect, and transmit contact force data of one or more subsystems of the fixturing control system 100.

In one aspect, the sensor 132 may sense a process, a component 110, a work piece part deviation, a force and/or the like. In one aspect, the sensor 132 may transmit a signal and display it on an interface to indicate, within a predetermined range, whether there is too much or too little contact force from the component 110, the actual force of the component 110, and/or a range of the force of the component 110.

In one aspect, the sensors 132 may also generate feedback signals through a wired or wireless communication channel, such as the connection network 150, to provide an operator 170 and/or a controller 160 information regarding whether the required threshold contact forces have been achieved or not.

In one aspect, the data and signals generated by the sensor 132 may be conditioned before being output to an operator 170, one or more visual displays 142, a strain conditioner unit 140 and/or a controller 160. In some aspects, the signal conditioning may be implemented in the sensor 132, the controller 160, the one or more visual displays 142 and/or the strain conditioner unit 140. The conditioning of the signal may include filtering, conversions to a digital signal utilizing an analog-to-digital converter, amplifying, and the like. In one aspect, the sensor 132 may be connected to a strain conditioner unit 140 that is configured to receive, condition, and output the force value, a dimensional feedback, and/or the like.

In one aspect, the fixturing control system 100 may include one strain conditioner unit 140, a plurality of the strain conditioner units 140, or as many of the strain conditioner units 140 as there are sensors 132. The strain conditioner unit 140 may be configured to receive inputs such as resistance signals, current signals, voltage signals, other signals, force signals, pressure signals, and the like and condition the signals to provide a force output.

In one aspect, the strain conditioner unit 140 may be further integrated with the one or more visual displays 142. In this aspect, the one or more visual displays 142 may enable an operator 170 to be able to visually see all of the necessary force and pressure data being transmitted from the sensors 132, the machine 120, the clamping system 122 or the like at one location and in real-time. In one aspect, the visual display 142 may have a threshold color changing capability, meaning that the forces displayed correlate and quickly alert an operator 170 to the sensor 132 value that is either within a range or outside of a range to properly machine a component 110. In another aspect, it is desired that the visual display 142 shows in one location on the strain conditioner unit 140, three different signals or channels on the visual display 142, for the operator 170 to see. In one aspect, the strain conditioner unit 140 may include an external or built-in shunt calibration capability. In one aspect, the one or more visual displays 142, the controller 160, the strain conditioner unit 140 and/or the like may enable an operator 170 to be able to audibly hear all of the necessary force and pressure data being transmitted from the sensors 132, the machine 120, the clamping system 122 or the like at one location and in real-time using an audio output device such as a speaker.

The one or more visual displays 142 may be arranged adjacent the fixturing control system 100, arranged on the machine 120, may be handheld, may be a bench top set-up, and the like. The one or more visual displays 142 may include a processor, a memory, a display, a user interface, and the like. The processor may be a central processing unit, microprocessor, dedicated hardware, or the like configured to execute instructions including instructions related to software programs. The display may be a liquid crystal display having a backlight to illuminate the various color liquid crystals to provide a colorful display. The user interface may be any type of physical input having one or more buttons, switches, and the like and/or may be implemented as a touchscreen. The one or more visual displays 142 may further include in the memory a computer readable memory, an operating system, a communication component, a contact/motion component, a touchscreen controller, a graphics component and the like. The operating system together with the various components providing software functionality for each of the components of the one or more visual displays 142. The one or more visual displays 142 may further include a read-only memory (ROM) and a power supply such as a battery. The memory may include a high-speed random-access memory. Also, the memory may be a non-volatile memory, such as magnetic fixed disk storage, flash memory or the like. The various components of the one or more visual displays 142 may be connected through various communication lines including a data bus. Additionally, the one or more visual displays 142 may include an audio input/output device. The audio input/output device may include speakers, speaker outputs, and in the like, providing sound output; and may include microphones, microphone inputs, and the like, for receiving sound inputs. The audio input/output device may include an analog to digital converter and a digital to audio converter for audio input and output functions respectively. The one or more visual displays 142 may include a transceiver for transmission over a communication channel as defined herein.

The strain conditioner unit 140 may be arranged adjacent the fixturing control system 100, arranged on the machine 120, may be handheld, may be a bench top set-up, and the like. The strain conditioner unit 140 may include a processor, a memory, a display, a user interface, and the like. The processor may be a central processing unit, microprocessor, dedicated hardware, or the like configured to execute instructions including instructions related to software programs. The display may be a liquid crystal display having a backlight to illuminate the various color liquid crystals to provide a colorful display. The user interface may be any type of physical input having one or more buttons, switches, and the like and/or may be implemented as a touchscreen. The strain conditioner unit 140 may further include in the memory a computer readable memory, an operating system, a communication component, a contact/motion component, a touchscreen controller, a graphics component and the like. The operating system together with the various components providing software functionality for each of the components of the strain conditioner unit 140. The strain conditioner unit 140 may further include a read-only memory (ROM) and a power supply such as a battery. The memory may include a high-speed random-access memory. Also, the memory may be a non-volatile memory, such as magnetic fixed disk storage, flash memory or the like. The various components of the strain conditioner unit 140 may be connected through various communication lines including a data bus. Additionally, the strain conditioner unit 140 may include an audio input/output device. The audio input/output device may include speakers, speaker outputs, and in the like, providing sound output; and may include microphones, microphone inputs, and the like, for receiving sound inputs. The audio input/output device may include an analog to digital converter and a digital to audio converter for audio input and output functions respectively. The strain conditioner unit 140 may include a transceiver for transmission over a communication channel or connection network 150 as defined herein. The one or more visual displays 142 may be integrated with the strain conditioner unit 140 and may be arranged adjacent the fixturing control system 100, arranged on the machine 120, may be handheld, may be a bench top set-up, and the like.

The controller 160 may be further connected to the fixturing control system 100, the machine 120, the production fixture rest pad 130, the sensors 132, the strain conditioner unit 140, and/or the like. The controller 160 may be equipped to receive and output the dimensional feedback, as well as provide closed-loop feedback capability to the fixturing control system 100. The controller 160 may communicate through a wired or a wireless communication channel as defined herein through a connection network 150. The controller 160 may further be configured to quantify deviation and diagnose a source, generate a mitigation plan, and send instructions to determine how to handle a deviation. In another aspect, the controller 160 may further be configured to process the component 110 or part with new instructions.

The controller 160 may include a processor, a memory, a display, a user interface, and the like. The processor may be a central processing unit, microprocessor, dedicated hardware, or the like configured to execute instructions including instructions related to software programs. The display may be a liquid crystal display having a backlight to illuminate the various color liquid crystals to provide a colorful display. The user interface may be any type of physical input having one or more buttons, switches, and the like and/or may be implemented as a touchscreen. The controller 160 may further include in the memory a computer readable memory, an operating system, a communication component, a contact/motion component, a touchscreen controller, a graphics component and the like. The operating system together with the various components providing software functionality for each of the components of the controller 160. The controller 160 may further include a read-only memory (ROM) and a power supply such as a battery. The memory may include a high-speed random-access memory. Also, the memory may be a non-volatile memory, such as magnetic fixed disk storage, flash memory or the like. The various components of the controller 160 may be connected through various communication lines including a data bus. Additionally, the controller 160 may include an audio input/output device. The audio input/output device may include speakers, speaker outputs, and in the like, providing sound output; and may include microphones, microphone inputs, and the like, for receiving sound inputs. The audio input/output device may include an analog to digital converter and a digital to audio converter for audio input and output functions respectively. The controller 160 may include a transceiver for transmission over a communication channel as defined herein. The controller 160 may include a processor operably associated with other electronic components such as a data storage device and communication channels that can receive, translate, store and output parameters.

In an illustrated aspect, subsystems of the fixturing control system 100 may communicate with the controller 160 through the connection network 150. The controller 160 may operate to in-process monitor and control the force and function of the various subsystems, such as monitor one or more outputs of the sensors 132, commanding the clamping system 122, the strain conditioner unit 140, and so forth.

In some aspects, the fixturing control system 100 may receive input from the operator 170 regarding the desired forces to be applied to the production fixture rest pad 130 by the component 110. In some aspects, the fixturing control system 100 may receive input from the operator 170 regarding the type of component 110 to be manufactured and the forces to be applied to the production fixture rest pad 130 by the component 110 and this information may be retrieved from a memory of the fixturing control system 100, the data acquisition system 180, or similar storage.

In one aspect, the fixturing control system 100 may output the desired forces and the forces to the operator 170 in order for the operator 170 to manually adjust the contact force exerted on the component 110 before and during fixturing. In one aspect, the fixturing control system 100 may output the desired forces and the forces to the clamping system 122 in order for the clamping system 122 to automatically adjust the contact force exerted on the component 110 before and during fixturing. In this regard, the clamping system 122 may operate a pneumatic system, hydraulics system, electromagnetic system, or the like to adjust the contact force before and during fixturing.

This monitoring and controlling by the controller 160 may be implemented by receiving information, converting and analyzing the information, and transmitting commands to various subsystems such as the data acquisition system 180, the strain conditioner unit 140, the visual display 142, and/or the sensors 132, all through at least one communication channel implemented by the connection network 150. In an illustrated aspect, an output signal of the sensor 132 may be a voltage or a current, and input into the controller 160. The controller 160 may be further configured to receive information indicative of an operational state of the remaining pertinent subsystems of the fixturing control system 100 such as, but not limited to forces, pressures, and the like. Accordingly, although various interfaces of the controller 160 are described relative to the machining system components of the fixturing control system 100 in the figures, such interfaces are not intended to limit the type and number of components 110 that are connected, nor the number of controllers 160 that are described.

The fixturing control system 100 may include a data acquisition system 180. The data acquisition system 180 may be connected to other subsystems including the controller 160 to monitor and record the real-time data flow during the set-up process, manufacturing process, welding process, tacking process, machining process, fixturing and/or the like process.

In one aspect, the data acquisition system 180 may be further configured to store a type of component 110, record the various forces that are acceptable during the set-up operation, and store whether the component 110 was properly manufactured, in further developing best practices and thresholds. Moreover, the sensor 132 may be coupled to the strain conditioner unit 140 as well as the data acquisition system 180 to provide the force information. The data acquisition system 180 may be configured to convert signals from the sensor 132 from analog to digital data and store a record of such values in real time.

In some aspects, the data acquisition system 180 might not just record, but might take the place of the strain conditioners 140. Said another way, the data acquisition system 180 may be an alternative and replace the strain conditioners 140. In this regard, the data acquisition system 180 may implement recording of force data and the data acquisition system 180 may implement conditioning in real-time. In one aspect, the data acquisition system 180 may include strain conditioner functionality, may include the ability to display data consistent with the visual display 142, record data, and interface with other controllers for other applications.

In some aspects, the clamping system 122 may include the sensor 132. For example, the clamping system 122 may be instrumented with the sensor 132, and the sensor 132 may be another input into the data acquisition system 180.

Referring to FIG. 1, in some aspects the production fixture rest pad 130 may be integral with the clamping system 122 and shown. In other aspects, the production fixture rest pad 130 in FIGS. 2-4 may be shaped and constructed differently than the production fixture rest pad 130 of FIG. 1 to account for heavier or lighter load sensitivity requirements. A production fixture rest pad 130 in accordance with the disclosure may vary in shape, geometry and concept.

Figure 2:
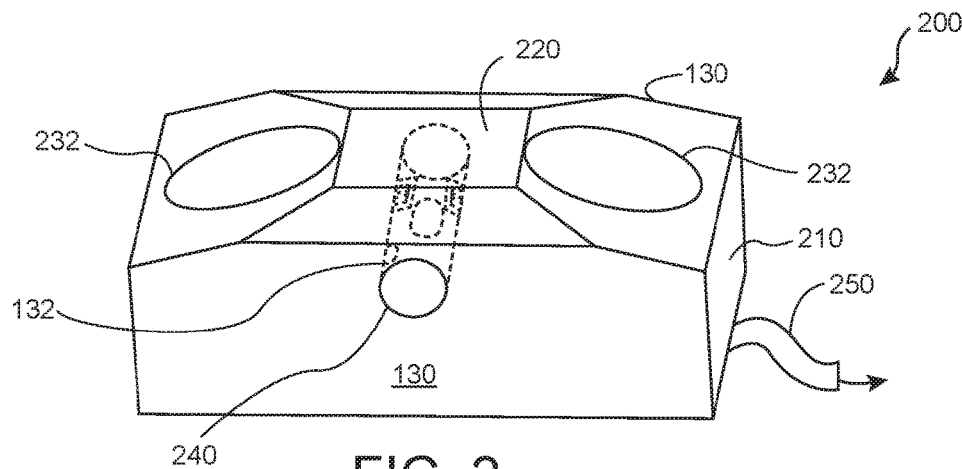
FIGS. 2, 3, and 4 illustrate exemplary constructions of a production fixture rest pad with an embedded force sensor that may be used in accordance with aspects of the disclosure.

FIG. 2 illustrates an operational configuration 200 of an aspect of a production fixture rest pad 130 integrated with the sensor 132 in accordance with aspects of the disclosure. In one aspect, the one or more production fixture rest pads 130 may be configured to be any geometric shape needed so as to interface with the component 110. For example, the production fixture rest pad 130 may be shaped as a rectangular block, circular block, spherical block, or any other geometric shape. The production fixture rest pad 130 may include at least one rigid outer wall 210. The production fixture rest pad 130 may further include an interface 220 with the component 110 (not pictured). The production fixture rest pad 130 may include a cavity 240 to receive the sensor 132 such as load cell, strain gauge or the like. In some aspects, the cavity 240 may have a generally cylindrical horizontal construction. In an illustrated aspect, the production fixture rest pad 130 includes two bored holes 232 for use with mounting bolts (not pictured) and configured to withstand high torque to ensure good contact between the boss and bottom face.

The production fixture rest pad 130 may be made of a material strong enough to withstand the range of pressure or forces exerted upon it. In one aspect, the production fixture rest pad 130 may be formed of a metallic material. In one aspect, the production fixture rest pad 130 may be formed of aluminum, iron, steel, brass, and the like. In one aspect, the production fixture rest pad 130 may include a synthetic non-slip surface.

In aspects that include a wired configuration, a cable or wire 250 may be connected to the sensor 132 and strung through the production fixture rest pad 130 out through an associated aperture. The wire 250 may be connected to one of the other subsystems of the machine 120. In aspects that include a wired configuration, the wire 250 may receive signals from the sensor 132 and provide power to the sensor 132 as well. In aspects that include a wireless configuration, a transceiver and associated circuitry may be connected to the sensor 132 and configured to transmit signals from the sensor 132 over the communication network 150 on a communication channel as defined herein to the controller 160 or other components of the fixturing control system 100.

Figure 3:
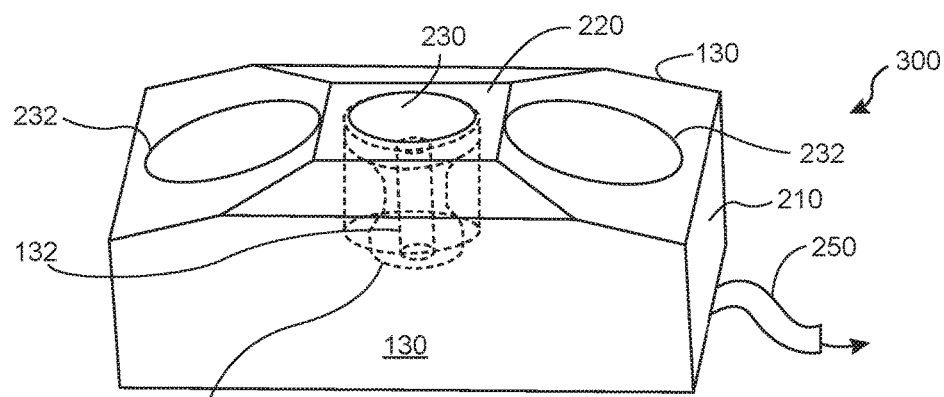

FIG. 3 illustrates an operational configuration 300 of an aspect of a production fixture rest pad 130 integrated with a sensor 132 in accordance with aspects of the present disclosure. In accordance with an illustrative aspect, the production fixture rest pad 130 is similar in construction to the aspect illustrated in FIG. 2, however the interface 220 may now include a raised structure 230 coupled to the interface 220 that is configured to force a steady and tight contact with the component 110 during operation as opposed to a much flatter interface on a rest pad construction. In some aspects, the raised structure 230 may be a result of a bored hole and an associated generally vertical hourglass construction may be configured to receive the sensor 132 such as load cell, strain gauge or the like. The inclusion of this type of construction is to account for force load sensitivity requirements. In aspects that include a wired configuration, a cable or wire 250 may be connected to the sensor 132 as noted above. In aspects that include a wireless configuration, a transceiver and associated circuitry may be connected to the sensor 132 as noted above. In an illustrated aspect, the production fixture rest pad 130 includes two bored holes 232 for use with mounting bolts (not pictured) and configured to withstand high torque to ensure good contact between the boss and bottom face.

Figure 4:
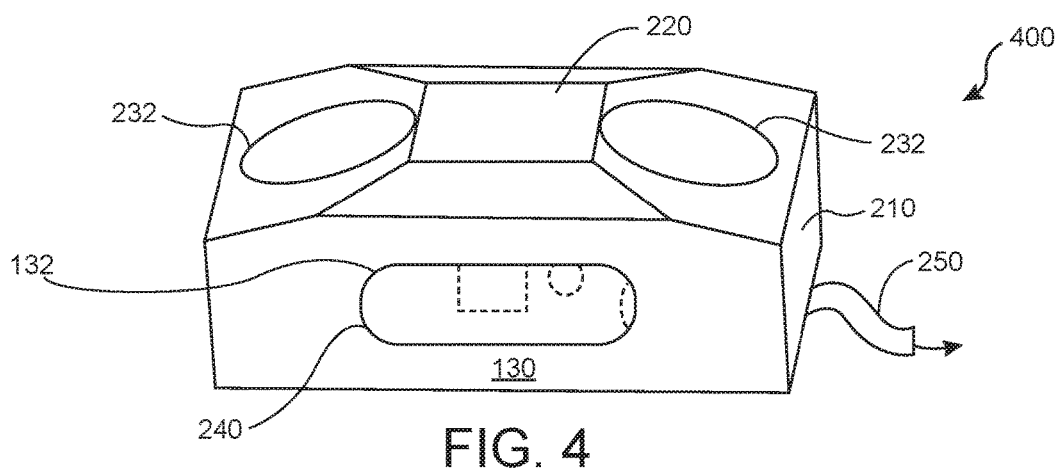

FIG. 4 illustrates an operational configuration 300 of an aspect of a production fixture rest pad 130 integrated with a sensor 132 in accordance with aspects of the present disclosure. In accordance with an illustrative aspect, the production fixture rest pad 130 may be configured with the cavity 240 having a generally horizontal oval slotted construction. In aspects that include a wired configuration, a cable or wire 250 may be connected to the sensor 132 as noted above. In aspects that include a wireless configuration, a transceiver and associated circuitry may be connected to the sensor 132 as noted above. In an illustrated aspect, the production fixture rest pad 130 includes two bored holes 232 for use with mounting bolts (not pictured) and configured to withstand high torque to ensure good contact between the boss and bottom face.

The production fixture rest pad 130 in FIGS. 2-4 may be further customized to be applied to both new and existing production fixtures, production tooling, and safety factors with minimum cost impact. The production fixture rest pad 130 may be customized to those processes which require higher force ranges. The rest pad load cell may be able to sustain machining environment such as cutting fluid, vibration and large chips. The load cell may also be modified to fill any cavities with a material capable of protecting a sensor from fluid and to seal the cavity 240, such as epoxy or the like. The production fixture rest pad 130 may be further configured with enhancements. These enhancements can be achieved through configuring the shape and/or material strength of the production fixture rest pad 130 depending on the potential use and ultimately ensure a longer lifecycle of the production fixture rest pad 130. For example, a production fixture rest pad 130 might have rounded edges or a special coating to prevent any concentrated stress that could cause material failure.

INDUSTRIAL APPLICABILITY

In some aspects, the disclosure relates to a continuous real-time closed-loop feedback determination of assembly operations such as proper positioning, machining and clamping of workpieces. More particularly, in some aspects, the disclosure relates to an apparatus and method for determining the proper positioning, machining and clamping of workpieces, with a dynamic fixturing feedback and control system. A benefit of this disclosure is to lower machining cost, and to lower or eliminate workpieces that are damaged during production and/or are poorly constructed.

Figure 5:
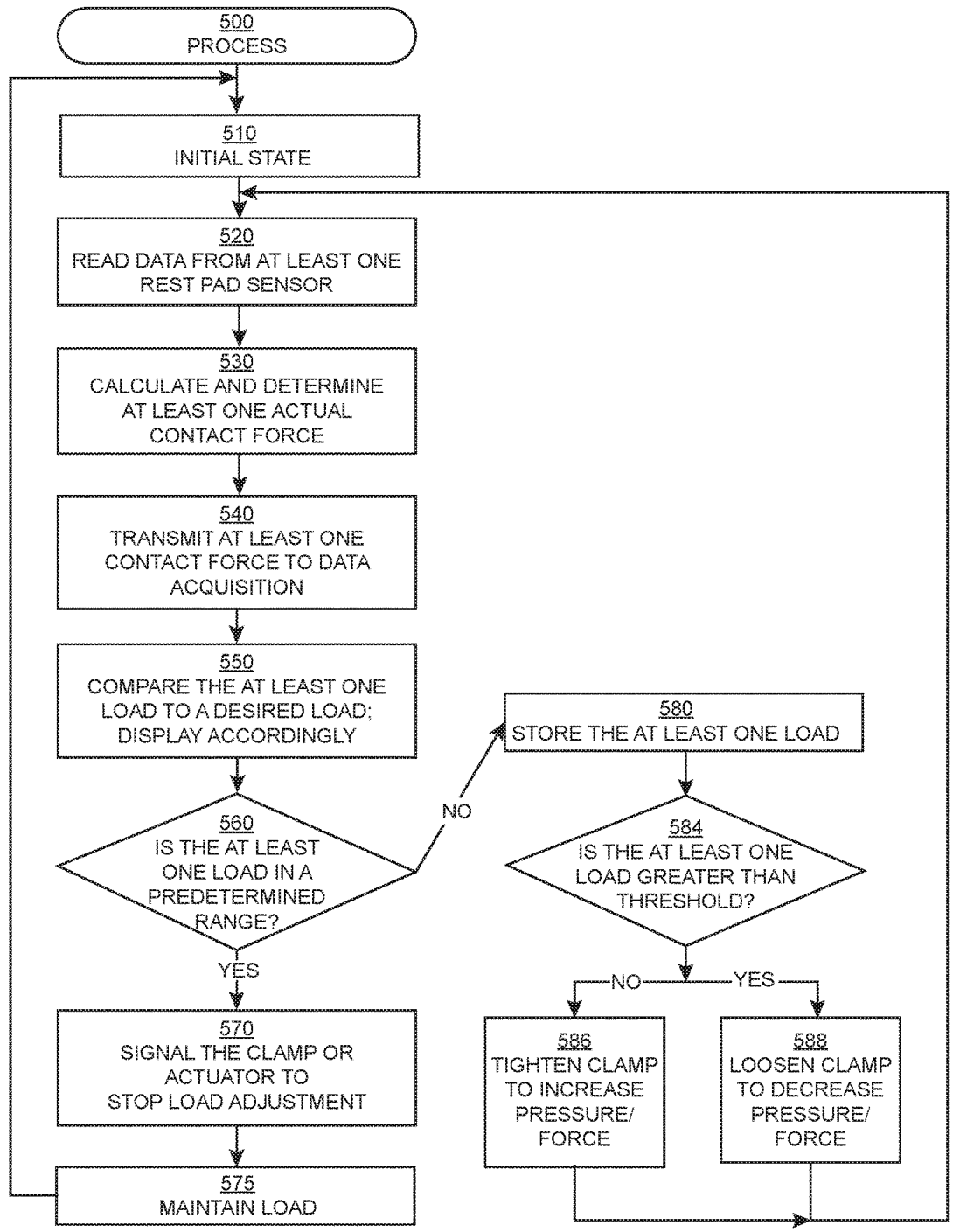
FIG. 5 illustrates a block diagram for a closed-loop feedback manufacturing process in accordance with aspects of the present disclosure.

FIG. 5 illustrates an exemplary block diagram for a manufacturing process 500 that may be implemented by the fixturing control system 100 in accordance with aspects of the present disclosure, also referencing and incorporating the previous illustrations in FIGS. 1-4. In one aspect, the controller 160 may be discretely and/or continuously monitoring a state of the fixturing control system 100, the sensors 132, an output of the sensors 132, the strain conditioner unit 140, the data acquisition system 180, subsystems and/or the like so as to dynamically measure and provide closed-loop feedback with respect to the contact force of the component 110 on the production fixture rest pads 130 before and during fixturing.

In one aspect, the fixturing control system 100 may output the state to the operator 170 in order for the operator 170 to manually adjust the contact force exerted on the component 110 before and during fixturing. In one aspect, the fixturing control system 100 may output the state to the clamping system 122 in order for the clamping system 122 to automatically adjust the contact force exerted on the component 110 before and during fixturing. In this regard, the clamping system 122 may operate the pneumatic system, the hydraulic system, the electromagnetic system, or like system to adjust the contact force exerted on the component 110 by the production fixture rest pad 130 before and during fixturing.

At block 510, the fixturing control system 100 may begin in an initial state of the closed-loop feedback manufacturing process 500 that includes the production fixture rest pads 130 equipped with force measurement capability in accordance with aspects of the disclosure. This initial state may be indicated by a near zero or zero output of force from the at least one sensor 132 that is configured to monitor a force the component 110 is making with the production fixture rest pad 130. The sensors 132 may be further configured to detect if there exists a force so that the fixturing control system 100 may trigger that contact has been initiated.

The sensors 132 also may also be configured to sense the inputs from a machine 120, pushers 126, or the like. Continuing to reference FIGS. 1-4, in a current example, the component 110 may be placed into the fixturing control system 100 for machining, fixturing, welding, manufacturing, tacking or the like. The machine 120 may be configured as a machining assembly to hold in fixture a workpiece or the component 110 to ensure solid contact and sufficient pressure throughout a given manufacturing or machining process needed. In one aspect, the machine 120 may include pushers 126, a clamping system 122, and the like that may be equipped to provide the necessary compression or tension forces upon the component 110 to hold the component 110 in place.

At block 510, the component 110 may be placed into the fixturing control system 100 on the machine 120. The fixturing control system 100 may use a software trigger that detects when the component 110 is undergoing force. If the component 110 is making contact with the production fixture rest pad 130, the sensor 132 will detect the force. For example, there may be three pushers 126 or clamps as part of the clamping system 122 so the fixturing control system 100 is detecting three respective signals from the sensors 132. In an aspect, the controller 160 may initiate the fixturing control system 100 to begin to receive and read various force input signals from the sensors 132, i.e. voltage, pressure or the like. In an aspect, an operator 170 may initiate the fixturing control system 100 to begin to receive and read various force input signals, i.e. load or pressure or the like, from the sensors 132. In yet another aspect, both a controller 160 and the operator 170 may receive and read various force input signals.

In some aspects in block 520, the fixturing control system 100 may receive input from the operator 170 regarding the desired forces to be applied to the production fixture rest pad 130 by the component 110. In some aspects, the fixturing control system 100 may receive input from the operator 170 regarding the type of component 110 to be manufactured and the forces to be applied to the production fixture rest pad 130 by the component 110 may be retrieved from a memory of the fixturing control system 100, the data acquisition system 180, or similar storage.

At block 530, the sensor 132, the strain conditioner unit 140, the data acquisition system 180, and/or the controller 160 may be configured to receive a voltage input and then calculate and determine at least one actual load or contact force associated with the component 110. In one aspect, the signals may be generated from multiple different sensors types. For example, the fixturing control system 100 may receive signals from the sensor 132 in response to actuation of the clamping system 122, the manual pushers 126, and the like changing the force applied to the production fixture rest pad 130. Additionally, further actuation of the clamping system 122, the manual pushers 126, and the like changing the force applied to the production fixture rest pad 130 may generate different signals from the sensor 132 which are provided to the fixturing control system 100.

At block 540, at least one load contact force signal may be transmitted from an output of the sensor 132 to the strain conditioner unit 140, the data acquisition system 180, and/or the controller 160. In one aspect, the transmission can be to a strain conditioner unit 140 with the displays 142 such that an operator 170 can visually read the load contact force. As such, the operator 170 can visually see a display reading because the component 110 may be in either compression or tension with the machine 120. The displays 142 may be equipped to display the force in Newtons. In another aspect, the operator 170 can audibly hear a reading from a speaker indicating that the component 110 is being subjected to a particular amount compression or tension due to the machine 120.

In another aspect, the transmission can be to a data acquisition system 180 for further analysis. The process may further include transmitting and sending analog signals from the production fixture rest pad 130, the sensor 132, a clamp sensor, or a pusher sensor arranged in the machine 120 such that analog signals may be sent to the controller 160 that may be configured to be pre-calibrated to calculate loads based upon pressures and wherein the analog signals are calculated only at a point determined by the contact force from a component. Alternately, the process otherwise includes sending analog signals from a sensor such as a tensiometer, load cell or strain gauge mounted on a subsystem which also generate calibrated analog signals in proportion to the strain experienced.

At block 550, the process can be configured to first compare the at least one load to a predetermined desired load and second display whether the load is within a predetermined range. In one aspect, the controller 160 may be monitoring and comparing the current states of the sensors 132 and subsystems, and in addition or alternatively comparing values to predetermine thresholds of force data stored in an electronic processor. In another aspect, an operator may be monitoring and comparing the current states of the sensors 132 that are being visually displayed on a visual display 142.

The contemplated ways for the process 500 to determine in advance the ideal force thresholds or range during machining or fixturing may be based on experience from prior executions of the process 500, or through computer processor simulation graphically to identify and note trends for a proper force contact range for use on the machine support system 128, or by doing a thorough study during machining operation and use those experimentally determined force numbers or ranges. The data acquisition system 180 may likewise be programmed to employ adaptive control algorithms. The data acquisition system 180 may also create force vs load chart showing how the output of the strain gauge relates to the force applied for subsequent interpretation.

This comparison algorithm may output the comparison findings to at least one visual display 142 corresponding with the respective sensor load readings. In an exemplary aspect, the system may give the operator 170 visual feedback. For example, this may be achieved by a strain conditioner unit 140 that receives and outputs dimensional feedback from at least three sensors 132 to at least three displays 142 connected to the strain conditioner 140. The display 142 may show in one location both a numerical value and an associated color to indicate if any one sensor 132 is exceeding the predetermined thresholds. A color and a number may signal to an operator 170 if a contact force is in the proper range or not. In some aspects, an amber color may indicate contact force is too low; red color may indicate contact force is too high; and a green color may indicate the force is within an acceptable threshold tolerance. In another contemplated aspect, the controller 160 is performing the same function of the operator 170.

Block 560 illustrates the closed-loop nature the process 500 may perform and respond to for an analysis of whether or not the force is within the acceptable pre-determined range. Should the process determine the force at the sensor 132 is within the predetermined range, then block 570 executes the function of signaling the appropriate clamp or actuator to stop exerting a load adjustment upon the component 110. As such, block 575 illustrates in one aspect an operator 170 completes the closed-loop nature of the process to maintain the load force exerted by the manufacturing process 500 upon the component 110.

In another aspect, the controller may perform the same function of using the closed-loop nature of the process to communicate to maintain the load force exerted by the manufacturing process 500 upon the component 110. The dimensional closed-loop feedback aspect of the process may iterate back to the block 510 initial state.

However should the process determine at block 560 that the data point is not within the predetermined range, then the process 500 advances to block 580. First, the data point may be stored as a data point for later evaluation in bettering the control algorithms. Then at block 584, the process 500 may determine if the at least one load is greater than the acceptable force threshold for the particular component 110.

In an aspect, an operator 170 may be adjusting by tightening or loosening the clamping system 122 to adjust the force on the production fixture rest pad 130. In another aspect, the controller 160 may be dynamically adjusting fixtures and clamps 124 to ensure contact forces are maintained throughout the operation and manufacturing process 500, and so the sequences can be monitored and recorded when compared with a data acquisition system 180.

Block 586 and block 588 illustrate how the process 500 can respond in real-time to either tighten or loosen a machine clamp pressure or force being exerted upon the component 110. Either block may execute and loop through the process to prevent improperly positioned or machined workpieces from being outside the desired threshold forces.

More specifically, in one aspect of block 586 and block 588, the fixturing control system 100 may output the state to the operator 170 in order for the operator 170 to manually adjust the contact force exerted on the component 110 before and during fixturing. In one aspect of block 586 and block 588, the fixturing control system 100 may output the state to the clamping system 122 in order for the clamping system 122 to automatically adjust the contact force exerted on the component 110 before and during fixturing. In this regard, the clamping system 122 may operate the pneumatic system, the hydraulic system, the electromagnetic system, or like system to adjust the contact force exerted on the component 110 by the production fixture rest pad 130 before and during fixturing.

For example, by measuring the contact force between the component 110 and the production fixture rest pad 132, and comparing this to the predetermined thresholds for maintaining a certain appropriate contact force, there may be found a large cutting force during machining where the component 110 is essentially lifting up from the rest pad. To prevent this lifting, an operator may need to respond at block 588 to the warning signals from the display outputs to finger-tighten the clamps, or apply the hydraulic pushers located adjacent the component 110. For example, the operator may employ the hydraulic system to generate a push thus clamping down the component 110. Alternatively at block 586, an operator may clamp other pushers and tighten a contact force instantaneously with the other pushers 126 or clamps. Next, an operator may move on to a third pusher 126 and clamp until the display reader displays an acceptable force value.

Accordingly, the disclosure sets forth an improved system to monitor, record, and correct a contact force on a component during manufacturing and the like. In this regard, the shortcomings of the prior art are addressed by the various aspects in the disclosure.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

While aspects of the present disclosure have been particularly shown and described with reference to the aspects above, it will be understood by those skilled in the art that various additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

We claim:

1. A manufacturing fixture assembly configured to hold a component in a fixed position during manufacturing comprising:
   at least one rest pad configured to support, at least in part, the component in the fixed position during the manufacturing;
   a sensor associated with the at least one rest pad and configured to sense a force exerted on the at least one rest pad by the component in the fixed position during the manufacturing;
   a clamping component configured to rigidly hold the component onto the at least one rest pad in the fixed position during the manufacturing;
   a force monitoring system configured to receive a signal from the sensor indicating the force exerted on the at least one rest pad before and during the manufacturing of the component held in the fixed position, wherein the force monitoring system is configured to determine whether the force exerted on the at least one rest pad comprises at least one of the following determinations: the force exerted on the at least one rest pad is within a predetermined range, the force exerted on the at least one rest pad exceeds the predetermined range, and the force exerted on the at least one rest pad is below the predetermined range; and
   an output device configured to output the determinations of the force exerted on the at least one rest pad,
   wherein the force monitoring system includes a controller configured to:
   receive the signal indicating the force exerted on the at least one rest pad,
   determine whether the force exerted on the at least one rest pad comprises the following: the force exerted on the at least one rest pad is within the predetermined range, the force exerted on the at least one rest pad exceeds the predetermined range, and the force exerted on the at least one rest pad is below the predetermined range,
   control the output device to output the determinations of the force exerted on the at least one rest pad,
   determine a remedial action for control of the clamping component when the force exerted on the at least one rest pad is outside the predetermined range, and
   control the clamping component based on the determined remedial action so the force exerted on the at least one rest pad is within the predetermined range.

2. The assembly of claim 1, wherein the at least one rest pad is configured to be supported by the manufacturing fixture assembly; and wherein the at least one rest pad is configured with a raised surface on which to support the component during the manufacturing.

3. The assembly of claim 1, wherein the sensor comprises a load cell.

4. The assembly of claim 1, wherein the sensor is arranged inside the at least one rest pad.

5. The assembly of claim 1, wherein the clamping component comprises at least one of the following: a clamp, a bolt, and a pusher.

6. The assembly of claim 1, wherein the force monitoring system comprises a strain conditioner configured to condition and display the signal indicating the force exerted on the at least one rest pad; and further wherein the strain conditioner is configured to determine whether the force exerted on the at least one rest pad comprises the following: the force exerted on the at least one rest pad is within the predetermined range, the force exerted on the at least one rest pad exceeds the predetermined range, and the force exerted on the at least one rest pad is below the predetermined range.

7. The assembly of claim 1, wherein the output device is a display configured to display the force exerted on the at least one rest pad, and further wherein the display is configured to display the force exerted on the at least one rest pad comprising at the following: the force exerted on the at least one rest pad is within the predetermined range, the force exerted on the at least one rest pad exceeds the predetermined range, and the force exerted on the at least one rest pad is below the predetermined range.

8. The assembly of claim 1, wherein the output device is configured to output the determination of the force exerted on the at least one rest pad to the force monitoring system; and wherein the force monitoring system is configured to monitor, record, and adjust the clamping component to ensure contact forces between the component and the at least one rest pad are maintained at pre-determined thresholds throughout the operation and assembly.

9. The assembly of claim 8, wherein the clamping component comprises at least one of the following: a hydraulic system, a pneumatic system, and an electromagnetic system.

10. The assembly of claim 1, wherein the determined remedial action includes automatically stopping the manufacturing of the component in the fixed position.

\* \* \* \* \*